US011978617B2

(12) United States Patent
Hoang et al.

(10) Patent No.: US 11,978,617 B2
(45) Date of Patent: May 7, 2024

(54) FOCAL PLANE DETECTOR

(71) Applicant: LUXEMBOURG INSTITUTE OF SCIENCE AND TECHNOLOGY (LIST), Esch-sur-Alzette (LU)

(72) Inventors: Hung Quang Hoang, Esch-sur-Alzette (LU); Tom Wirtz, Grevenmacher (LU)

(73) Assignee: LUXEMBOURG INSTITUTE OF SCIENCE AND TECHNOLOGY (LIST), Esch-sur-Alzette (LU)

( * ) Notice: Subject to any disclaimer, the term of this patent is extended or adjusted under 35 U.S.C. 154(b) by 339 days.

(21) Appl. No.: 17/635,475

(22) PCT Filed: Aug. 14, 2020

(86) PCT No.: PCT/EP2020/072898
§ 371 (c)(1),
(2) Date: Feb. 15, 2022

(87) PCT Pub. No.: WO2021/032639
PCT Pub. Date: Feb. 25, 2021

(65) Prior Publication Data

US 2022/0293407 A1 Sep. 15, 2022

(30) Foreign Application Priority Data

Aug. 16, 2019 (LU) .................................. LU101359

(51) Int. Cl.
*H01J 49/02* (2006.01)
*H01J 49/00* (2006.01)

(52) U.S. Cl.
CPC ........ *H01J 49/025* (2013.01); *H01J 49/0031* (2013.01)

(58) Field of Classification Search
CPC ..... H01J 49/025; H01J 49/0031; H01J 43/246
USPC .......................................................... 250/397
See application file for complete search history.

(56) References Cited

U.S. PATENT DOCUMENTS 4,785,172 A 11/1988 Kubena et al.
2002/0175292 A1 11/2002 Whitehouse et al.
2004/0227070 A1* 11/2004 Bateman ............... H01J 49/025 250/397
2005/0253062 A1* 11/2005 Laprade ................ H01J 49/025 250/397
2023/0170205 A1* 6/2023 Hoang .................. H01J 49/025 250/282

OTHER PUBLICATIONS

Martin V. Zombeck, et al., High-resolution camera (HRC) on the Advanced X-Ray Astrophysics Facility (AXAF), SPIE—International Society for Optical Engineering, Proceedings, vol. 2518, Sep. 1, 1995, pp. 96-106, 12 pages.

(Continued)

*Primary Examiner* — Kiet T Nguyen
(74) *Attorney, Agent, or Firm* — Rankin, Hill & Clark LLP

(57) ABSTRACT

A detection device for detecting charges particles. The active area of the detector extends along a principal direction over several centimeters and up to 1 meter or more. This allows for its use as a focal plane detector for a mass spectrometer device, allowing to record all mass-to-charge ratios provided by the spectrometer in parallel and within a reduced acquisition time.

17 Claims, 2 Drawing Sheets

(56) References Cited

OTHER PUBLICATIONS

Jining Xie, "Stereomicroscopy: 3D Imaging and the Third Dimension Measurement", Sep. 19, 2011, Retrieved from Internet: http://www.toyo.co.jp/files/user/img/product/microscopy/pdf/5990-9127EN.pdf; 8 pages.
Osterman, et al., "The Cosmic Origins Spectrograph: on-orbit instrument performance", Astrophysics and Space Science, Kluwer Academic Publishers, DO, vol. 335, No. 1, Apr. 21, 2011, 10 pages.
Villette, et al. "Calibration of a Multiple Microchannel Plate Detectors System by alpha-induced secondary electrons", Review of Scientific Instruments, AIP, Melville, NY, US, vol. 71, No. 6, Jun. 1, 2000, 4 pages.
Morosov, et al., "2[pi] spectrometer: A new apparatus for the investigation of ion surface interaction", Review of Scientific Instruments, vol. 67, No. 6, Jun. 1, 1996, 10 pages.
Birkinshaw, "Fundamentals of Focal Plane Detectors", Journal of Mass Spectrometry, vol. 32, No. 8, Aug. 1, 1997, 12 pages.
International Search Report, PCT/EP2020/072898, dated Nov. 5, 2020, 4 pages.

* cited by examiner

FOCAL PLANE DETECTOR

TECHNICAL FIELD

The invention lies in the field of charged particle and low energy radiation detectors. In particular it relates to one dimensional focal plane detector that finds use in Secondary Ion Mass Spectrometry, SIMS.

BACKGROUND OF THE INVENTION

It is known to use Secondary Ion Mass Spectrometry, SIMS, devices for analytical and imaging purposes. In known SIMS devices, a focused primary ion beam is used to illuminate the surface of a sample. Thereby, material is sputtered from the sample, which creates localised secondary ion emissions stemming from the sample. These secondary ions can be analysed by different kinds of spectrometers. Generally, the secondary ions are first filtered in accordance with their mass-to-charge ratio, and then detected, classified or imaged accordingly. Other modes comprise the recoding of a mass spectrum or of a depth profile of the sample.

Owing in particular to its excellent sensitivity, its high dynamic range, its good depth resolution and its ability to differentiate between isotopes, SIMS constitutes a powerful technique for analysing sample surfaces and thin films. The fundamental lateral information limit in SIMS is determined by the area at the surface from which secondary ions are emitted. This depends both on the primary beam parameters (ion species, energy) and on the sample composition. For primary ion beams with energies in the range of a few keV up to a few tens of keV and masses from 4 up to 133 amu, this area is between 2 and 10 nm. Currently, the imaging resolution on commercial SIMS instruments is limited by the probe size of the primary beam rather than such fundamental considerations. In practice, resolutions in the 50 nm range are currently possible on the Cameca NanoSIMS 50™ instrument, which is capable of producing 2D elemental mappings with a lateral resolution of around 50 nm, as well as 3D elemental reconstructions of the analysed volume. As a consequence, new fields of application for SIMS, e.g. in life sciences, nanotechnologies and astronomy, are emerging.

In SIMS, secondary ions are extracted from the sample by applying a voltage difference between the sample and an extraction electrode. Depending on the application, three different types of mass spectrometers are used in SIMS. Quadrupole mass spectrometers have the lowest mass resolution and transmission and therefore are therefore of lesser interest for the present invention. Time-of-flight, ToF, mass spectrometers are mostly used for the detection of molecular fragments or even whole molecules, as this technique leads to an unlimited mass range. Mass measurement occurs through the measurement of the flight time of the secondary ions between a given origin, e.g. the sample, and the detector. The flight time is initiated by a pulse of the primary or secondary ion beam. However, the pulsing operation typically limits the duty-cycle, resulting in low sensitivity. Some modern TOF mass spectrometer configurations employ a pre-trapping unit to accumulate the secondary ions before injecting into the TOF in order to improve the duty cycle. However, the requirement in gas cooling for the pre-trapping system has never demonstrated in an integration for SIMS. The third mass spectrometer type is based on magnetic sector mass spectrometers.

Compared to ToF mass spectrometers, magnetic sector mass spectrometers present the advantage of continuous analysis removing the duty cycle induced by beam pulsing, which leads to better overall sensitivities if the primary ion beam is operated in the DC mode, or to better overall sensitivities for similar analysis times if the primary ion beam is pulsed. However, they typically present a reduced mass range, limiting their application to the analysis of monatomic and small cluster ions. In a double focusing magnetic sector instrument, achromatic mass filtering (i.e., filtering that is independent of the initial energy distribution of the secondary ions) is achieved by combining an electrostatic analyser with the magnetic filter. In most known magnetic mass spectrometers, the magnetic field must be tuned for a selected mass-to-charge ratio m/z (or ion mass) to reach the detector. Hence, during analysis the magnetic field is scanned over the different masses of interest. Parallel mass detection is possible when using the Mattauch-Herzog design, where all ion masses are focused in a focal plane containing several detectors.

A Mattauch-Herzog type mass analyzer consists of an electrostatic sector, ESA, followed on the secondary ion trajectories by a magnetic sector. The arrangement of the electrostatic sector and the magnetic sector typically allows dispersing a wide range of mass-to-charge ratios m/z along the exit plane of the magnetic sector. All the ion masses are focused on a focal plane located at the exit plane (in the original Mattauch-Herzog configuration), or at a distance from the exit plane of the magnetic sector. Most of the known Mattauch-Herzog type mass spectrometers are able to operate in the double focusing condition (achromatic mass filtering) for the highest mass resolving power. A typical mass resolving power from hundreds to thousands are achieved.

In order to acquire a mass spectrum, a detection system is used to collect all the ion masses along the focal plane. Typically, a single/multi-collector detection system is used to achieve this. A single detector or a multi-collector of several (X) single detectors is placed on the focal plane. Here, there are two known workflows that can be used to acquire the mass spectrum/images. In the first workflow, the detector/multi-collector is fixed at a certain position on the focal plane. The magnetic field of the magnetic sector is ramped in order to scan all the ion masses through the detection system. At a certain detection time, only one (single detector) or X (multi-collector) ion masses can be acquired. In this workflow, an electro-magnetic sector is always required. In the second workflow, the magnetic field of the magnetic sector is fixed at a value to disperse all the ion masses of interest along the focal plane. The detector/multi-collector is then moved along the focal plane to acquire a full mass spectrum or fixed at one or X locations of the ion masses of interest for imaging acquisition (in a multi-collector system, each detector can be moved independently). Similar to the first workflow, only one or X of ion mass-to-charge ratios m/z can be detected at a time. This workflow works for both the electro-magnet and the permanent magnet magnetic sectors.

In both workflows, the system can construct maximum one or X of ion mass images in parallel. As SIMS is a destructive technique, improving the number of the parallel detectors helps to maximize the useful information from a sample under analysis. In practice, the number of the detectors that can be installed is limited, for example, to 5-7 detectors in the latest Cameca NanoSIMS™ instrument. It is therefore currently not possible to acquire a full parallel mass spectrum snapshot using SIMS, without resorting to multiple analysis at different times, where for each analysis the detectors are appropriately displaced along the focal plane of the SIMS instrument. Even so, the resulting spectral data will represent the sample's composition at varying depths owing to the destructive nature of each single SIMS analysis.

Technical Problem to be Solved

It is an objective of the invention to present a method, which overcomes at least some of the disadvantages of the prior art.

SUMMARY OF THE INVENTION

In accordance with a first aspect of the invention, a detection device for detecting charged particles or radiation is proposed. The device comprises a front area extending longitudinally along a principal direction. The front area comprises an arrangement of the respective entry faces of at least two microchannel plate, MCP, assemblies, wherein each MCP assembly is configured for receiving charged particles, neutral particles or radiation that impinge on its entry face and for generating a corresponding amplified detection signal on its opposite exit face. The device further comprises at least one read-out anode for collecting said amplified detection signals, the anode being arranged at a distance to, and in parallel with the respective exit faces of said MCP assemblies. The at least two MCP assemblies are arranged side by side along said principal direction, and a gap of at most 1 mm separates the entry faces of any two adjacent MCP assemblies. The detection device further comprises biasing means configured for applying a common electric potential to the respective exit faces of all MCP assemblies, and for applying individual electric potentials to the respective entry faces of each MCP assembly.

Preferably, all the device's MCP assemblies may be arranged side-by-side along said principal direction.

Preferably, the read-out anodes may comprise a delay-line anode, a pixelated anode array, a resistive anode, a shaped anode, or a single anode.

The entry faces of the at least two MCP assemblies may preferably extend over an aggregated distance of at least 15 cm. Preferably, the distance may be between 15 and 100 cm.

Preferably, the device may comprise one dedicated read-out anode for each MCP assembly, and said read-out anode may preferably extend along the MCP assembly's exit face. Alternatively, a single read-out anode, common to all MCP assemblies, may be provided.

The read-out anodes may preferably comprise delay-line anodes, pixelated anode arrays, resistive anodes, shaped anodes, single anodes or any combination thereof.

It may be preferred that a gap of at most 1 mm width separates the respective exit faces of any two adjacent MCP assemblies.

The gap size between any two adjacent MCP assemblies may preferably be the same.

Preferably, the gap separating any two adjacent read-out anodes may have substantially the same width as the gap separating the entry and exit faces of the corresponding two adjacent MCP assemblies.

All MCP assemblies may preferably have substantially the same channel size and amplification gain characteristics.

Preferably, all MCP assemblies may have the same width extending perpendicularly to said principal direction.

The detector's front area may preferably consist of the entry faces of said MCP assemblies.

Preferably, the biasing means may be configured for applying an electric potential difference between the respective entry and exit faces of each MCP assembly. The biasing means may preferably comprise a source of electricity. Preferably, an individual electric potential difference may be applied between the respective entry and exit faces of each individual MCP assembly.

The biasing means may preferably be configured for applying a positive or negative floating electric potential to the detector's front face.

The MCP assemblies may preferably comprise a stacked assembly of a plurality of multiple MCP devices, a chevron assembly or a Z-stacked assembly.

The charged particles may preferably comprise ions, and the radiation may preferably comprise visible light.

In accordance with another aspect of the invention, a mass spectrometer for dispersing ions along a focal plane in accordance with their mass/charge ratio, the spectrometer comprising a detection device that is arranged on said focal plane so that said dispersed ions impinge on the detection device's front area, characterized in that said detection device is a device according an aspect of the invention.

Preferably, the mass spectrometer device may be a Mattauch-Herzog type device. The mass spectrometer may preferably be configured for being used in a floating configuration.

A detection device in accordance with aspects of the invention allows for providing a detector extending over any distance along a linear direction. While there will certainly be applications of the proposed detection device in electromagnetic radiation detection, charged particle detection and neutral particle detection (for example in electron spectroscopy/spectrometry, X-Ray spectrometry, optical spectroscopy/spectrometry, space applications, etc. . . . ), a primary use of the detection device in accordance with aspects of the invention lies in a focal plane detector, FPD, for a mass spectrometry device that spreads analysed ions along a focal plane. By way of example, Mattauch-Herzog mass spectrometers usually have a long focal plane ranging from several centimetres to a hundred centimetres, to cover the entire ion mass range of interest. Due to the combination of several multi-channel-plate, MCP, assemblies, in accordance with aspects of the invention, a full length FPD can be provided. This is achieved irrespective of any manufacturing limitations on the dimensions of a single MCP assembly. The full length FPD may be placed along the focal plane of the mass spectrometer's magnetic sector. This allows for acquiring in parallel all the ion masses m/z escaping the magnetic sector's exit plane. Therefore, a full mass spectrum can be collected in parallel in a short acquisition time, thereby enabling data processing and analysis of the complete spectral data of the analysed sample. The FPD in accordance with aspects of the invention is able to collect the complete chemical information, i.e. mass spectral data and images, from a sample under analysis with a 100% duty cycle of all ion masse-to-charge ratios m/z. Using multichannel plates, MCP provides several advantages, including their high sensitivity (single particle detection), high dynamic range ($10^6$) (ensuring wide detecting chemical concentration), the possibility for high spatial resolution (<50 μm) along the principal direction (ensuring high mass resolution capability of the mass spectrometer), and their capability to detect all types of particles, including electrons, ions, atoms, molecules and photons. In particular, MCP technology can provide flexible shapes and sizes of a single MCP assembly of up to 15 centimetres, which is the largest single detector size available at the time of writing. This helps to minimize the complexity of the proposed detection device that provides a large size detector. In addition, MCP is a mature and reliable technology. In accordance with aspects of the invention, read-out anodes of different types may be used for different MCP assemblies along the length of the focal plane. This allows for leveraging the strengths of different anode readout technologies in one detector. For example, a pixelated anode array like a micro-faraday strip array or a charge-coupled device, CCD, active anode array may be selected for a mass range where high mass resolution (and therefore high spatial resolution of the detector, below 50 μm) is required, while high sensitivity is not required. On the other hand, a delay-line anode may be selected for mass ranges where high sensitivity is needed with lower required spatial resolution.

The project leading to this application has received funding from the European Union's Horizon 2020 research and innovation programme under grant agreement No 720964.

BRIEF DESCRIPTION OF THE DRAWINGS

Several embodiments of the present invention are illustrated by way of figures, which do not limit the scope of the invention, wherein.

DETAILED DESCRIPTION OF THE INVENTION

Figure 1:
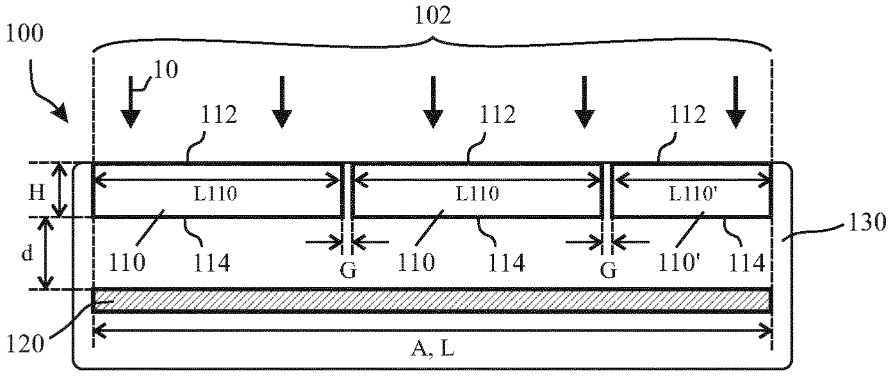
FIG. 1 is a schematic illustration of a top view of a detection device in accordance with a preferred embodiment of the invention.

This section describes features of the invention in further detail based on preferred embodiments and on the figures, without limiting the invention to the described embodiments. Unless otherwise stated, features described in the context of a specific embodiment may be combined with additional features of other described embodiments. Throughout the description, similar reference numerals will be used for similar or the same concept across different embodiments of the invention. For example, references 100 and 200 each describe a detection device in accordance with the invention, but in two respective embodiments thereof.

The description puts focus on those aspects of the proposed detector device that are relevant for understanding the invention. It will be clear to the skilled person that the device also comprises other commonly known aspects, such as for example an appropriately dimensioned power supply, or a mechanical holder frame for holding the various elements of the device in their respectively required positions, even if those aspects are not explicitly mentioned.

FIG. 1 shows a top view of a cut through a detection device 100 in accordance with a preferred embodiment of the invention. For the sake of explaining the various concepts, the illustrated dimensions are not at scale and some distances have been exaggerated for easier appreciation of the figure. The device comprises a front area 102 that extends along a principal direction A, defining the "single" direction along which the one-dimensional detection device 100 extends. The device further comprises a plurality of microchannel plate, MCP, assemblies 110 arranged side by side along the principal direction. The front faces 112 of the MCP assemblies make up the front area 102 of the device 100, save for the physical gaps or interstices G that separate the MCP assemblies. In the example shown, three MCP assemblies are used. Of course, other pluralities are possible without departing from the scope of the present invention. Depending on the available MCP sizes and on the desired total length L (e.g., from 15 to 100 cm) of the detection area, an appropriate number of MCP assemblies is integrated into the device 100. In the example of FIG. 1, two MCP assemblies extending over a common length L110 are arranged side by side, while a third MCP assembly extends over a shorter length 110', thereby providing a shorter entry face. The depth H of each MCP assembly is preferably the same, so that the amplification characteristics are uniform along the length L of the detector. By way of a non-limiting example, the depth His typically of about 0.5 to 1 mm for a single MCP assemblies, 1-2 mm for a Chevron type stacked MCP assembly, and 1.5-3 mm for a Z-stacked type MCP assembly. Ideally, the gaps G are of neglectable size, but they should in practice not be larger than 1 mm. Indeed, a charged particle (i.e. ions, electrons) or neutral particle (i.e. atoms, molecules) or electromagnetic radiation (i.e. light, X-ray, etc. . . . ) 10 impinging on the front face 102 can only be detected if it hits a front face 112 of one of the MCPs, the gaps G forming dead spots in the detection range. Preferably, the gaps between any two adjacent MCP assemblies are of uniform size. Each impinging charged particle or photon generates a corresponding amplified signal at the exit face 114, 114' of the MCP assembly whose entry face 112, 122' it hit. The gap G extends to the respective exit faces of two adjacent MCP assemblies. In order to detect the amplified signals, at least one read-out anode 120 is arranged in parallel to the exit faces 114, 114' of the MCP assemblies 110, at a distance d (typically but not limited to 2-5 mm) therefrom. The read-out anode(s) is/are operatively coupled to non-illustrated data processing means, which store the detection counts read by the anode(s), together with their position along the length L of the detector. By doing so, spectral data of the incoming charged particles, neutral particles or electromagnetic radiation 10 is produced. The spectral data is preferably stored in a memory element for further processing thereof, or for displaying the same on a display device. The processing means may for example comprise a data processor having read/write access to a memory element. While the data processor may comprise specific circuitry designed for reading out the anode(s) 120, it may alternatively comprise a programmable processor, programmed to perform this task by an appropriate software code. All described components are held in place by a holder frame 130 which may for example be a machined frame.

Figure 2:
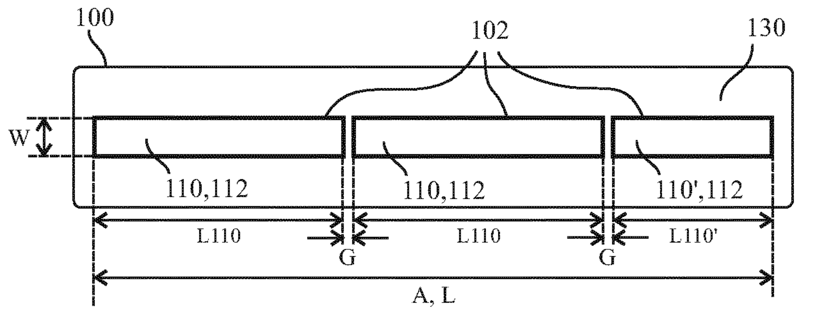
FIG. 2 is a schematic illustration of a front view of a detection device in accordance with a preferred embodiment of the invention.

FIG. 2 provides a frontal view on the front area 102 and on the entry faces 112 of the MCP assemblies 110 of the device 100 as shown from the top on FIG. 1. It is appreciated that each MCP extends along a similar or equal width W in the direction that is perpendicular to the principal direction A of the device. The width W may range from millimetres to centimetres, for example from 3 mm to 15 cm.

A typical microchannel plate, MCP, is composed of $10^4$ to $10^7$ miniature electron multipliers whose typical diameters are in the range from 10 to 100 μm. Each channel acts as an individual electron multiplier, which can detect a single ion, electron, atom, molecule or photon. The MCP is typically fabricated from a high resistive material such as lead glass. The front side and rear side of the MCP are metallized electrodes to which a typical voltage difference of about 1000V is applied through appropriate biasing means, such as a source of electricity. When a single energetic particle hits a channel surface, it creates one or more secondary electrons, which are accelerated into an MCP channel by the applied voltage. Each of these secondary electrons can release two or more secondary electrons when hitting the channel wall again. This process is cascaded along the channel Therefore, a single energetic particle hitting a channel creates a cascade of electron emission along the channel, resulting in an electron cloud of at least $10^4$ electrons at the output of the channel. An anode placed behind the MCP can electronically detect the electron cloud to register each single event hitting the MCP. An MCP assembly 110 such as those depicted in FIG. 1 may comprise a single microchannel plate, or a stacked assembly thereof.

Figure 3A:
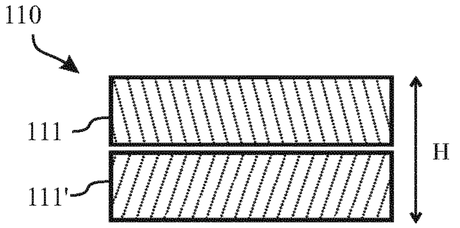
FIG. 3*a* is a schematic illustration of a stacked chevron type microchannel plate assembly as used in a detection device in accordance with a preferred embodiment of the invention.
Figure 3B:
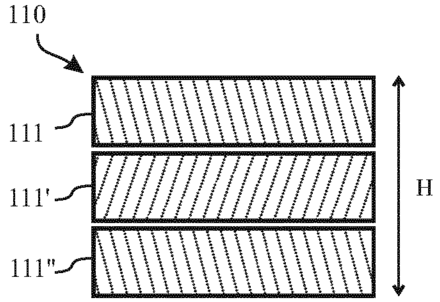
FIG. 3*b* is a schematic illustration of a stacked Z-type microchannel plate assembly as used in a detection device in accordance with a preferred embodiment of the invention.

Each MCP typically provides an amplification gain of $10^4$. In most of the applications, a higher gain ($10^6$-$10^7$) is required. Several stacked MCPs can be used to achieve such a high gain. When using stacked MCPs, the channels of each MCP are tilted 8°-15° against the MCP normal. The channels of the following MCPs are tilted in the opposite directions in order to avoid the ion feedback from the successive MCPs. The combination of two MCPs 111, 111' in an assembly 110 in this configuration is called the Chevron assembly, see FIG. 3*a*, while the combination of three MCPs 111, 111', 111" in an assembly 110 is called the Z-stack assembly, see FIG. 3*b*. The type of MCP assembly that is integrated to the device 100 depends on the required amplification gain. However, within one device 100, MCP assemblies of the same channel size and amplification gain are used to maintain uniform detection efficiency and spatial resolution along the entire detector.

Different types of anodes 120 may be considered for collecting the electrons leaving the MCP assemblies 110. The first type is a single anode, which is typically a single metal plate placed behind the MCP. This anode plate collects total number of electrons leaving the entire MCPs and therefore detects the total signal intensity hitting the MCPs (analog current or number of particles). The second type of anode is related to the position sensitive anode readouts, which can return both the position and the intensity of multiple events hitting the MCPs. Different types of position sensitive anode readout are currently used for the MCP-based detectors such as delay line, DL, anode, resistive anode, pixelated anode array, shaped anode, single anode, etc. . . . . Integrated array detectors, which are fabricated and coupled with the electronic circuits into a chip-type packaging for direct charge detection can also be used as read-out anodes in combination with the MCP assemblies. In this case, they are all referred as pixelated anode arrays. Several approaches to this type of detector have been developed including active pixel arrays, micro faraday cup arrays and micro faraday strip arrays.

Figure 4:
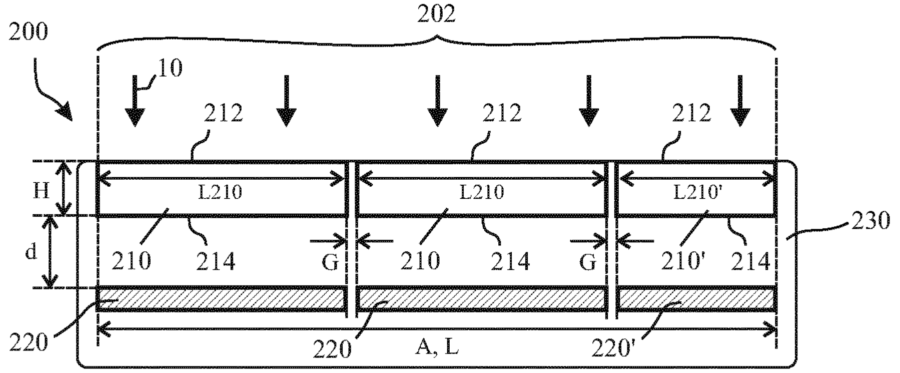
FIG. 4 is a schematic illustration of a top view of a detection device in accordance with a preferred embodiment of the invention.

FIG. 4 shows a top view of a cut through a detection device 200 in accordance with a preferred embodiment of the invention. For the sake of explaining the various concepts, the illustrated dimensions are not at scale and some distances have been exaggerated for easier appreciation of the figure. The device comprises a front area 202 that extends along a principal direction A. As in the previously described embodiment, the device further comprises a plurality of microchannel plate, MCP, assemblies 210 arranged side by side along the principal direction. The front faces 212 of the MCP assemblies make up the front area 202 of the device 200, save for the physical gaps or interstices G that separate the MCP assemblies. In the example shown, three MCP assemblies are used. Of course, other pluralities are possible without departing from the scope of the present invention. Depending on the available MCP sizes and on the desired total length L (e.g. from 15 to 100 cm) of the detection area, an appropriate number of MCP assemblies is integrated into the device 200. In the example of FIG. 4, two MCP assemblies extending over a common length L210 are arranged side by side, while a third MCP assembly extends over a shorter length 210', thereby providing a shorter entry face. The depth H of each MCP assembly is preferably the same, so that the amplification characteristics are uniform along the length L of the detector. Ideally, the gaps G are of neglectable size, but they should in practice not be larger than 1 mm. Indeed, a charged particle (i.e. ions, electrons) or photon 10 impinging on the front face 202 can only be detected if it hits a front face 212 of one of the MCPs, the gaps G forming dead spots in the detection range. Preferably, the gaps between any two adjacent MCP assemblies are of uniform size. Each impinging charged particle or photon generates a corresponding amplified signal at the exit face 214, 214' of the MCP assembly whose entry face 212, 222' it hit. The gap G extends to the respective exit faces of two adjacent MCP assemblies. In order to detect the amplified signals, one dedicated read-out anode 220, 220' for each MCP assembly 210, 210' is arranged in parallel to the respective exit faces 214, 214' of the MCP assemblies 210, in alignment therewith and at a distance d therefrom. All described components are held in place by a holder frame 130 which may for example be a machined frame.

Each MCP segment 210, 210' combined with its anode 220, 220' acts as an individual detector element. There are two main advantages of this configuration over the use of a single anode. Firstly, it helps to maximize the uniformity along the overall detector by adjusting the individual gain of each MCP to achieve the same detection efficiency of each anode. Secondly, it improves the overall dynamic range and count rate of the detector, which is typically limited by the anode readout. Here, the overall dynamic range and count rate are multiplied by the number of the anode readouts compared to those of each individual anode. Different anode types can be combined in one detector 200, including DL anode, resistive anode, pixelated anode array, single anode, etc. . . . . Each anode is selected in such a way that it is optimized for applications in its mass range. This allows for leveraging the strengths of different anode readout technologies in one detector device 200. For example, an integrated array like micro-faraday strip array can be selected for a mass range where high mass resolution (and therefore high spatial resolution of the detector (below 50 μm) is needed while high sensitivity is not required. On the other hand, the DL anode can be selected for the mass ranges where high sensitivity is needed with lower required spatial resolution.

In all the disclosed embodiments, the MCP assemblies are located close to each other, having a gap of at most 1 mm in between themselves along the main direction. If a common electric potential would be applied on the front/entry faces of each MCP assembly, and different electric potentials would be applied on the back/exit faces of MCPs, then a large field distortion would be generated around the gap separating the exit faces of neighbouring MCP assemblies, thereby creating a large detection dead-zone. Biasing a common potential on the exit faces of all MCP assemblies solves this issue. Therefore, in all the embodiments described herein, the biasing voltage differences between the entry and exit faces of the MCP assemblies can be independently regulated from each other in order to adjust their individual gain, so as to improve the uniformity and detection efficiency along the length L of the detector. Further, in all embodiments, the same electric potential $U_{common}$ is applied to all of the exit faces of the respective MCP assemblies arranged side by side along the principal direction. For achieving different biases between the respective entry and exit faces of an MCP assembly, the electric potentials $U_1$, $U_2$, . . . applied to the corresponding entry faces of the first, second, . . . MCP assemblies may in this case be different. The corresponding voltage differences ($U_{common}-U_1$, $U_{common}-U_2$, . . . ) applied to the respective MCP assemblies are typically chosen in the range from 800 to 1200 V for a single MCP configuration, 1600-2400V for a Chevron-type configuration and 2400-3600V for a Z-stack MCP configuration, without being limited to these examples. For a given type of MCP configuration, the range of potential differences that are applied to the series of MCP assemblies may preferably span 0 to 200V, each difference being chosen in order to adjust the individual gain of each MCP assembly for a particular application. This arrangement provides the advantage of generating a more uniform and homogeneous electrical field in the space that separate the MCP exit faces from the read-out anode(s), thereby smoothing rather than amplifying the effect of the gap that exists between any two adjacent MCP assemblies. This arrangement allows to limit the electrical field distortion around of the gap that separates the exit faces of any two adjacent MCP assemblies. Limiting this distortion also limits a detection dead-zone along the detection front that extends in the principal direction of the device, thereby improving the device's detection performance. Also, the detector device is able to be floated to a high voltage of up to 10 kV, while the floating potential may have either positive or negative polarity.

Figure 5:
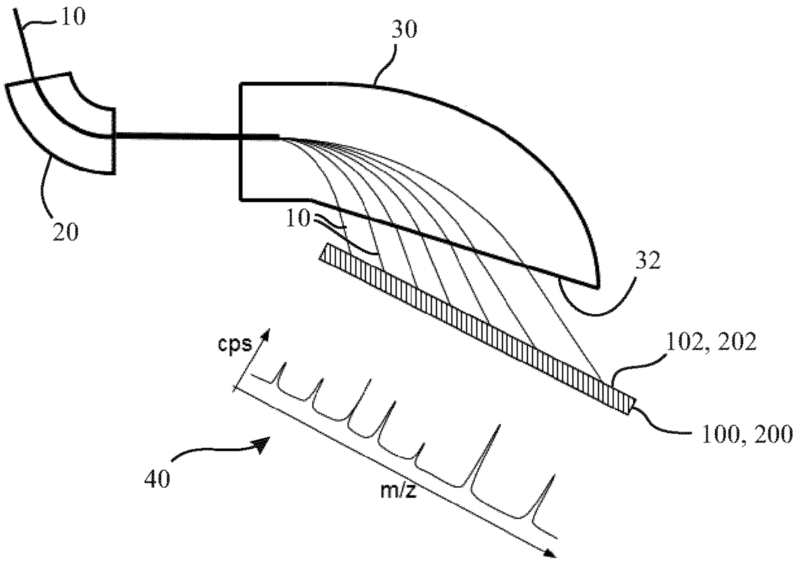
FIG. 5 is a schematic illustration of a mass spectrometer device in accordance with a preferred embodiment of the invention.

FIG. 5 illustrates components of a Mattauch-Herzog type spectrometer device in accordance with an aspect of the invention. The functioning of such spectrometers, which use an electrostatic sector 10 followed by a magnetic sector 30 for filtering an incoming ion beam 10 is well understood in the art and will not be explained in further details in the context of this description. The magnetic sector 30 comprises an exit plane 32 through which the ions comprised in the initial beam exit, spread along a principal direction in accordance with their respective mass-to-charge ratios. On the focal plane of the spectrometer, a detection device 100, 200 in accordance with any of the previously described embodiments is arranged, so that a full mass spectrum 40 may be obtained on the read-out anode(s) thereof, as previously described. The detection device is high vacuum/ultra-high vacuum, HV/UHV, compatible and covers the full focal plane of the Mattauch-Herzog mass spectrometer, which is typically from several centimetres to several tens of centimetres. It provides one-dimensional (horizontal) spatial resolution of better than 100 μm, a maximum overall count rate of better than $10^7$ cps, a dynamic range better than $10^6$, high sensitivity of better than 1 cps as well as both positive and negative ion detections.

Of course, the detection device may be used in other applications and in other spectrometers spreading an incoming ion beam along a focal plane without departing from the scope of the invention. The dimensions of the detector may be customized to provide a 1D focal plane detector having an active area (W×L100/L200) that fits into any mass spectrometer with a focal plane. The active width W can be ranged from few millimeters to several centimeters (<15 cm). The length L can be chosen from several centimetres to more than 100 cm (unlimited length in principle). The spatial resolution of the detector can be as high as 50 μm. There is a physical gap of less than 1 mm between the MCP assemblies. This physical gap results in a dead-zone in the mass spectrum at the region where the mass dispersion overlaps on the gap. The detector device with N MCP assemblies will create N−1 dead-zones in the acquired mass spectrum. The overall dynamic range and count rate of the detector are improved by using a separate anode readout for each MCP assembly. The detector with N MCP assemblies can approximately provide an overall dynamic range and count rate that are N times higher than those of a single MCP segment.

It should be understood that the detailed description of specific preferred embodiments is given by way of illustration only, since various changes and modifications within the scope of the invention will be apparent to the skilled person. The scope of protection is defined by the following set of claims.

The invention claimed is:

1. A detection device for detecting charged particles or radiation, the detection device comprising a front area extending longitudinally along a principal direction, the front area comprising an arrangement of entry faces of at least two microchannel plate (MCP) assemblies, wherein each of the MCP assemblies is configured for receiving charged particles, neutral particles or electromagnetic radiation that impinge on their respective entry faces and for generating a corresponding amplified detection signal on a respective opposite exit face, the device further comprising at least one read-out anode for collecting said amplified detection signals, the anode being arranged at a distance to, and in parallel with the respective exit faces of said MCP assemblies, wherein the at least two MCP assemblies are arranged side by side along said principal direction, and wherein a gap of at most 1 mm separates the entry faces of any two adjacent MCP assemblies, wherein the detection device further comprises biasing means configured for applying a common electric potential to the respective exit faces of all of the MCP assemblies, and for applying individual electric potentials to the respective entry faces of each of the MCP assemblies.

2. The detection device according to claim 1, wherein the entry faces of the at least two MCP assemblies extend over an aggregated distance of at least 15 cm.

3. The detection device according to claim 1, wherein the detection device comprises one dedicated read-out anode for each of the MCP assemblies, and wherein said read-out anode extends along the exit face of the respective MCP assembly.

4. The detection device according to claim 3, wherein the read-out anode of each of the MCP assemblies comprises at least one of delay-line anodes, pixelated anode arrays, resistive anodes, shaped anodes, and single anodes.

5. The detection device according to claim 3, wherein a gap of at most 1 mm width separates the respective exit faces of any two adjacent MCP assemblies.

6. The detection device according claim 5, wherein the gap separating any two adjacent read-out anodes has a same width as a gap separating the entry and exit faces of the corresponding two adjacent MCP assemblies.

7. The detection device according to claim 1, wherein all of the MCP assemblies have a same channel size and same amplification gain characteristics.

8. The detection device according to claim 1, wherein all of the MCP assemblies have a same width extending perpendicularly to said principal direction.

9. The detection device according to claim 1, wherein said front area consists of the entry faces of said MCP assemblies.

10. The detection device according to claim 1, wherein said biasing means are configured for applying an electric potential difference between the respective entry and exit faces of each of the MCP assemblies.

11. The detection device according to claim 10, wherein the biasing means are configured for applying a positive or negative floating electric potential to the front area.

12. The detection device according to claim 1, wherein the MCP assemblies comprise at least one of a stacked assembly of a plurality of multiple MCP devices, a chevron assembly, and a Z-stacked assembly.

13. The detection device according to claim 1, wherein said charged particles comprise ions.

14. The detection device according to claim 1, wherein said electromagnetic radiation comprises visible light.

15. A mass spectrometer for dispersing ions along a focal plane in accordance with their mass/charge ratio, the spectrometer comprising the detection device of claim 1 that is arranged on said focal plane so that said dispersed ions impinge on the front area of the detection device.

16. The mass spectrometer device according to claim 15, wherein the mass spectrometer device is a Mattauch-Herzog type device.

17. The mass spectrometer device according to claim 15, wherein the mass spectrometer device is configured for being used in a floating configuration.

* * * * *